United States Patent
Hata et al.

(10) Patent No.: US 8,317,014 B2
(45) Date of Patent: Nov. 27, 2012

(54) BELT CONVEYOR

(75) Inventors: Kenji Hata, Akashi (JP); Takashi Kotaki, Kobe (JP); Narihiro Yoh, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 12/675,377

(22) PCT Filed: Aug. 20, 2008

(86) PCT No.: PCT/JP2008/002256
§ 371 (c)(1), (2), (4) Date: Jan. 24, 2011

(87) PCT Pub. No.: WO2009/028155
PCT Pub. Date: Mar. 5, 2009

(65) Prior Publication Data
US 2011/0108395 A1 May 12, 2011

(30) Foreign Application Priority Data
Aug. 28, 2007 (JP) .................. 2007-220661

(51) Int. Cl.
*B65G 15/08* (2006.01)
(52) U.S. Cl. .................. 198/819; 198/820
(58) Field of Classification Search .......... 198/818–830, 198/417
See application file for complete search history.

(56) References Cited

U.S. PATENT DOCUMENTS

| 5,246,102 A | * | 9/1993 | Rappen et al. | 198/819 |
| 5,836,440 A | * | 11/1998 | Mindich | 198/819 |
| 7,281,624 B2 | * | 10/2007 | Hartsuiker et al. | 198/811 |

FOREIGN PATENT DOCUMENTS

| JP | 2-10306 | 1/1990 |
| JP | 9-169414 | 6/1997 |
| JP | 2808351 | 7/1998 |
| JP | 11-334825 | 12/1999 |
| JP | 11-334826 | 12/1999 |
| JP | 2003-128218 | 5/2003 |

OTHER PUBLICATIONS

International Search Report for PCT/JP2008/002256. mailed Nov. 18, 2008.

* cited by examiner

*Primary Examiner* — James R Bidwell
(74) *Attorney, Agent, or Firm* — Marshall, Gerstein & Borun LLP

(57) ABSTRACT

Belt reversing mechanisms configured to reverse a belt at an upstream portion and a downstream portion of a return belt of a belt conveyor, includes two sets of pinch rollers spaced apart from each other in a belt movement direction and configured to support the belt, and two sets of guide roller mechanisms spaced apart from each other in the belt movement direction and are configured to guide the belt in a tubular shape from outside between the pinch rollers such that the belt is reversed 180 degrees and twisted to cause a center portion of a span between the pinch rollers so as to form a tubular open cross-section with a dirty surface facing inward; and the belt between the two sets of pinch rollers forms a catenary curve or a curve close to the catenary curve.

6 Claims, 8 Drawing Sheets

BELT CONVEYOR

TECHNICAL FIELD

The present invention relates to a belt conveyor, and more particularly to a belt conveyor in which a belt forms a catenary curve between two sets of pinch rollers of each of belt reversing mechanisms for reversing the belt at an upstream portion and a downstream portion of a return belt.

BACKGROUND ART

A belt conveyor for conveying various materials such as powdery materials, granular materials, or lumpy materials includes two sets of pulleys provided at a start end portion and a terminal end portion, respectively, an endless loop belt wrapped around the pulleys, and a drive means for rotating the drive pulley. The drive means causes the drive pulley to revolve the belt. Thereby, the materials put on a carrier belt are conveyed from the start end to the terminal end. At the terminal end pulley, the belt makes a U-turn in a downward direction, the return belt moves from the terminal end to the start end, and the belt makes a U-turn in an upward direction at the start end pulley.

The surface of the belt conveyor on which the materials are put is a dirty surface. In a case where the return belt is placed such that the dirty surface faces downward, the materials scatter from the dirty surface of the return belt and contaminate a floor surface or the like. To avoid this, conventionally, belt reversing mechanisms are provided at the upstream portion and the downstream portion of the return belt, respectively, in a direction in which the belt moves. The belt reversing mechanism at the upstream portion reverses the belt 180 degrees to cause the dirty surface to face upward, while the belt reversing mechanism at the downstream portion reverses the belt back to the state where the dirty surface faces downward. In this state, the belt moves toward the start end pulley.

In a belt reversing apparatus of a belt conveyor disclosed in Japanese Utility Model Application Publication No. Hei. 2-10306, two sets of belt reversing mechanisms each including a guide roller mechanism having sixth rollers arranged annularly are provided to be spaced apart from each other and are adapted to guide the belt such that the belt is retained to have a tubular open cross-section. In addition to retaining the belt to have the tubular open cross-section, an example in which the belt is retained to have a flat U-shaped cross-section is disclosed.

A belt reversing apparatus of a belt conveyor disclosed in Japanese Patent No. 2808351 includes two sets of pinch rollers which are provided at both end portions to support the belt from upper and lower surfaces, and plural reversing guide units (guide roller mechanisms) including plural rollers arranged annularly between these pinch rollers to respectively guide the belt such that the belt is retained to have a tubular open cross-section.

DISCLOSURE OF THE INVENTION

Problems to be Solved by the Invention

However, in the conventional belt conveyor reversing apparatus, the belt and the plural reversing guides are disposed between the two sets of pinch rollers such that the belt (axis of belt) extends in a substantially straight line shape. In this type of belt conveyor, for example, an interval between the pitch rollers is as long as 30~50 m. Also, when the belt between the pinch rollers is supported by, for example, three reversing guide units, deformation, slack and the like of the belt occur because of the weight of the belt, and as a result, it is impossible to guide the belt such that the cross-sectional shape of the belt gradually changes in the order of a flat plate cross-section, a circular-arc cross-section, a tubular open cross-section, a circular-arc cross-section and a flat plate cross-section.

Accordingly, in an actual belt conveyor reversing apparatus, between the pinch rollers, plural support rollers must be provided at intervals of 3 or 4 m to support the belt, in addition to the plural reversing guide units. Because of the addition of the plural support rollers, facility cost of the belt conveyor increases. When the belt is guided and supported by the plural support rollers such that the belt has desired cross-sectional shapes as described above, the cross-sectional shape of the belt gets unstable, for example, it gets distorted or gets flattened excessively, because the belt is guided and supported only by the plural rollers which are adapted to contact the outer surface of the belt from outside.

In addition, a burden of maintenance work for the belt, the plural support rollers, etc increases, and durability of the belt degrades due to repetitive uneven deformation of the belt.

An object of the present invention is to provide a belt conveyor which is capable of stabilizing a belt cross-sectional shape in a belt conveyor reversing apparatus, omitting support rollers and the like or reducing them in number, alleviating a burden of maintenance work, and improving durability of the belt.

Means for Solving the Problems

To solve the aforesaid problem, a belt conveyor of the present invention, comprises an endless loop belt which is wrapped around pulleys at both ends thereof and is configured to revolve; and a first belt reversing mechanism and a second belt reversing mechanism which are provided at an upstream portion and a downstream portion of a return belt, respectively, in a belt movement direction, and are configured to reverse the belt 180 degrees; wherein each of the first and second belt reversing mechanisms includes two sets of pinch rollers which are provided so as to be spaced apart from each other in the belt movement direction and configured to support the belt, and one or more sets of guide roller mechanisms which are provided so as to be spaced apart from each other in the belt movement direction and are configured to guide the belt in a tubular shape from outside between the pinch rollers such that the belt is reversed 180 degrees and twisted to cause a center portion of a span between the pinch rollers to form a tubular open cross-section with a dirty surface facing inward; and wherein the belt between the two sets of pinch rollers substantially forms a catenary curve.

In accordance with such a configuration, each of the first and second belt reversing mechanisms includes two sets of pinch rollers, and one or more sets of guide roller mechanisms which are configured to guide the belt in the tubular shape from outside between the pinch rollers such that the belt is reversed 180 degrees and twisted to cause the center portion of the span between the pinch rollers to form the tubular open cross-section with the dirty surface facing inward; and the belt between the two sets of pinch rollers substantially forms the catenary curve. Therefore, the cross-sectional shape of the belt is easily stabilized, and it is not necessary to forcibly correct the cross-sectional shape of the belt against the tension and weight of the belt. This makes it unnecessary to add support rollers for correcting the cross-sectional shape of the belt in addition to the one or more sets of guide rollers, or makes it possible to reduce the support rollers in number. As a result, facility cost of a belt conveyor reversing apparatus can be reduced.

In addition, since the cross-sectional shape of the belt is easily automatically corrected, a burden of maintenance work for maintaining and inspecting the belt, the guide roller mechanism and the like can be reduced. In addition, since repetitive uneven deformation of the belt does not substantially occur, durability of the belt can be improved.

In the belt conveyor of the present invention, the guide roller mechanism includes plural first guide rollers having center axes present in a first reference plane and plural second guide rollers having center axes present in a second reference plane which is spaced a predetermined distance apart from the first reference plane and is parallel to the first reference plane; and the first and second reference planes are provided to extend in a direction perpendicular to the catenary curve of the belt or a curve close to the catenary curve in a position of the guide roller mechanism.

In such a configuration, the guide roller mechanism includes the plural first guide rollers having center axes present in the first reference plane and the plural second guide rollers having center axes present in the second reference plane which is spaced a predetermined distance apart from the first reference plane and is parallel to the first reference plane; and the first and second reference planes are provided to extend in the direction perpendicular to the catenary curve of the belt or the curve close to the catenary curve in the position of the guide roller mechanism. Since the movement speed of the belt with respect to the first reference plane formed by the plural first rollers is equal, the operation stability and durability of the first guide rollers can be ensured. Likewise, since the movement speed of the belt with respect to the second reference plane formed by the plural second rollers is equal, the operation stability and durability of the second guide rollers can be ensured.

EXPLANATION OF REFERENCE SYMBOLS

Figure 1:
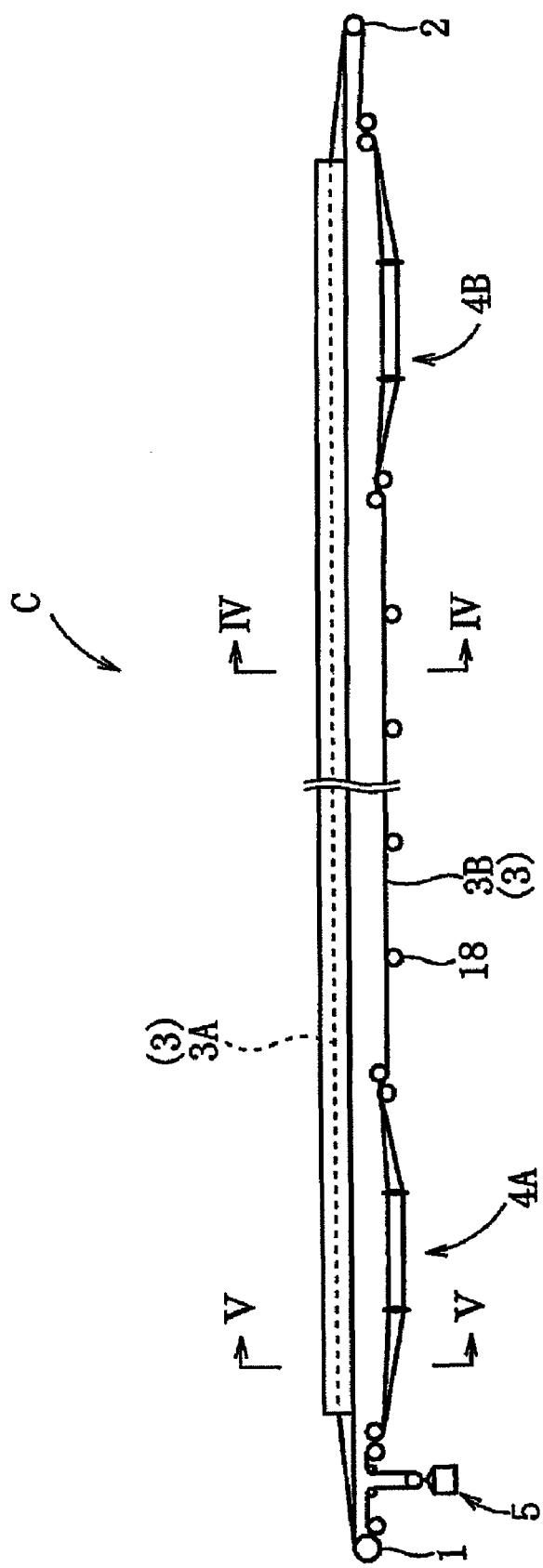
FIG. 1 is a schematic side view of a belt conveyor according to an embodiment of the present invention.

C belt conveyor
1 drive pulley
2 driven pulley
3 belt
3A carrier belt
3B return belt
4A, 4B belt reversing mechanism
10, 11 pinch roller
12 guide roller mechanism
13A, 13B first and second reference planes
14, 15 first and second guide rollers

BEST MODE FOR CARRYING OUT THE INVENTION

Hereinafter, a best mode for carrying out the present invention will be described with reference to the drawings.
Embodiment 1

As shown in FIG. 1, a belt conveyor C according to this embodiment includes a drive pulley 1 and a driven pulley 2 provided at both ends thereof, respectively, an endless loop belt 3 which is wrapped around the pulleys 1 and 2 and configured to revolve, an electric motor (not shown) for rotating the drive pulley 1, first and second belt reversing mechanisms 4A and 4B which are provided at the upstream portion and the downstream portion of a return belt 3B, respectively, in a belt movement direction, and configured to reverse the belt 180 degrees, a belt tensioner mechanism 5 for maintaining a constant tension of the belt 3, etc.

Figure 4:
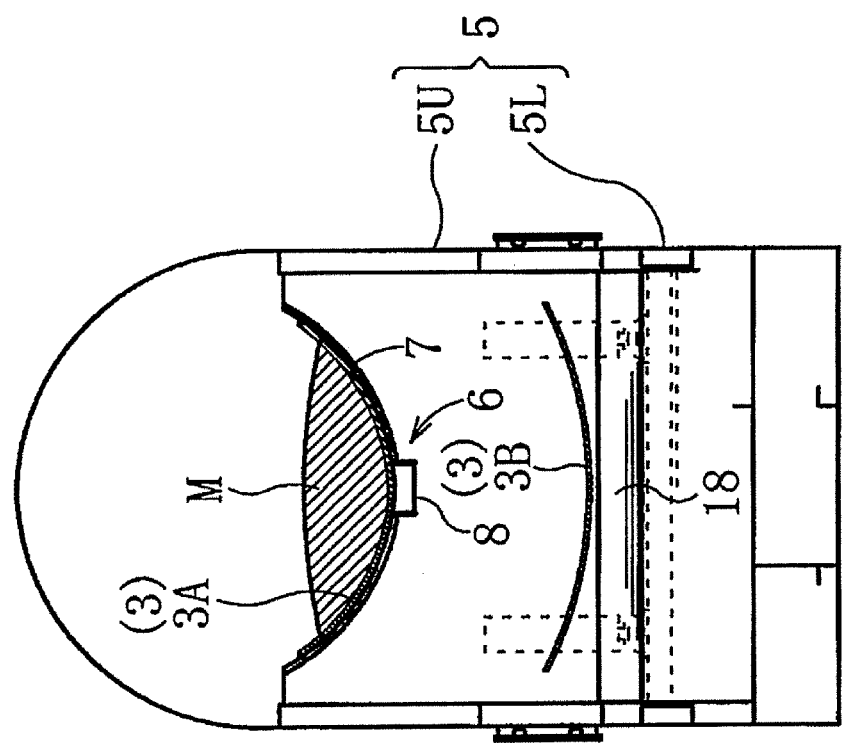
FIG. 4 is a cross-sectional view taken along line IV-IV of FIG. 1.

As shown in FIG. 4, the belt conveyor C includes a casing 5, and a belt floating mechanism 6 for floating a carrier belt 3A by a pressurized air film. The belt floating mechanism 6 includes a conveyor path forming plate 7 forming a belt support surface for supporting the belt 3 in a curved shape, an air passage 8 for guiding a pressurized air to be supplied to a space between the conveyor path forming plate 7 and the belt on the upper surface of the conveyor path forming plate 7, a pressurized air supply means (not shown), etc. The case 5 includes an upper case 5U and a lower case 5L. In FIG. 1, the lower case 5L is not illustrated. Since materials M are put on and conveyed on the upper surface of the carrier belt 3A, the upper surface of the carrier belt 3A is a dirty surface.

Subsequently, the first and second belt reversing mechanisms 4A and 4B will be described.

Figure 2:
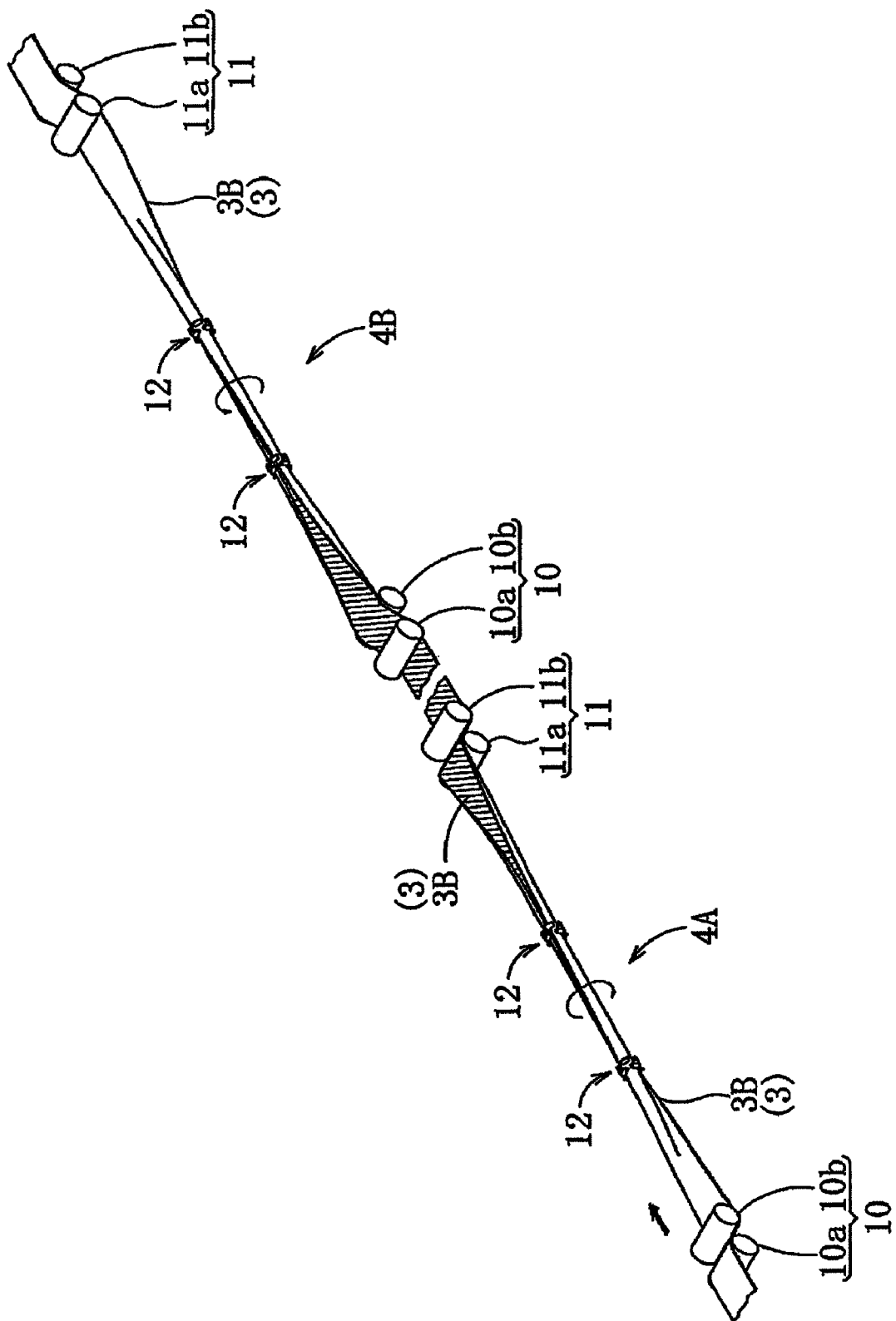
FIG. 2 is a perspective view of major parts of a belt and a belt reversing mechanism.

As shown in FIG. 2, the first belt reversing mechanism 4A serves to reverse the belt 3 whose dirty surface faces downward to a state where the dirty surface faces upward, at the upstream portion of the rerun belt 3B in the belt movement direction, while the second belt reversing mechanism 4B serves to reverse the belt 3 whose dirty surface faces upward to a state where the dirty surface faces downward, at the downstream portion of the rerun belt 3B in the belt movement direction. Since the first and second belt reversing mechanisms 4A and 4B have the same structure, the first belt reversing mechanism 4A will be described, by way of example.

Figure 3:
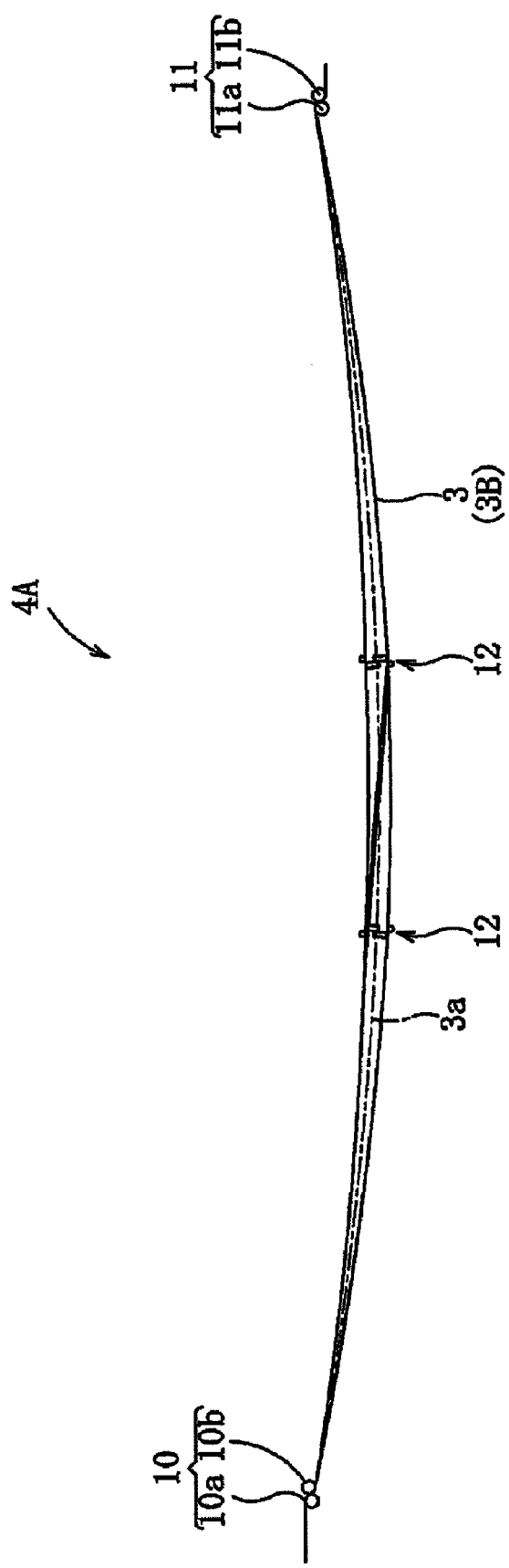
FIG. 3 is a side view of the major parts of the belt and the belt reversing mechanism

As shown in FIGS. 1 to 3, the first belt reversing mechanism 4A includes two sets of pinch rollers 10 and 11 which are provided so as to be spaced apart from each other in the movement direction of the belt 3 and are configured to support the upper and lower surfaces of the belt 3, and two sets of guide roller mechanisms 12 which are provided so as to be spaced a predetermined distance apart from each other in the belt movement direction and are configured to guide the belt 3 in a tubular shape from outside between the two sets of pinch rollers 10 and 11 such that the belt 3 is reversed 180 degrees and twisted to cause the center portion of the span between the pinch rollers 10 and 11 to form a tubular open cross-section with the dirty surface facing inward.

As shown in FIG. 2, the belt reversing mechanism 4A twists the belt 3 between the pinch rollers 10 and 11 clockwise in a direction from an upstream side toward a downstream side, while the belt reversing mechanism 4B twists the belt 3 between the pinch rollers 10 and 11 counterclockwise in a direction from the upstream side toward the downstream side.

The upstream pinch roller 10 consists of two rollers 10a and 10b and the downstream pinch roller 11 consists of two rollers 11a and 11b.

As shown in FIG. 3, the belt 3 is disposed to substantially form a catenary curve between the two sets of pinch rollers 10 and 11. To be precise, a center line 3a of the belt 3 substantially forms the catenary curve. The catenary curve is a curve defined by the following formula (1), based on a weight W (Kg/m) per unit length of the belt 3, a tension T (Kg) applied to the belt 3, and a span L(m)(distance between the pinch rollers). δ in the following formula (2) is a deflection amount of the belt at the center portion of the span.

$$y=(T/W)\times[\cos h(x\times W/T)-1] \quad (1)$$

$$\delta=(T/W)\times[\cos h(L\times W/2T)-1] \quad (2)$$

Note that the belt 3 may be disposed to form a curve close to the catenary curve which is represented by the following formula, instead of the aforesaid catenary curve.

$$\delta=WL^2/(8T)$$

In the case of the belt conveyor C of this embodiment, the span length from the pinch roller 10 to the pinch roller 11 in the first belt reversing mechanism 4A is, for example, 45 m, the span length between the two sets of guide roller mechanisms 12 is, for example, 9 m, and the span length from the pinch roller 10 to the guide roller mechanism 12 is, for example, 18 m.

Figure 5:
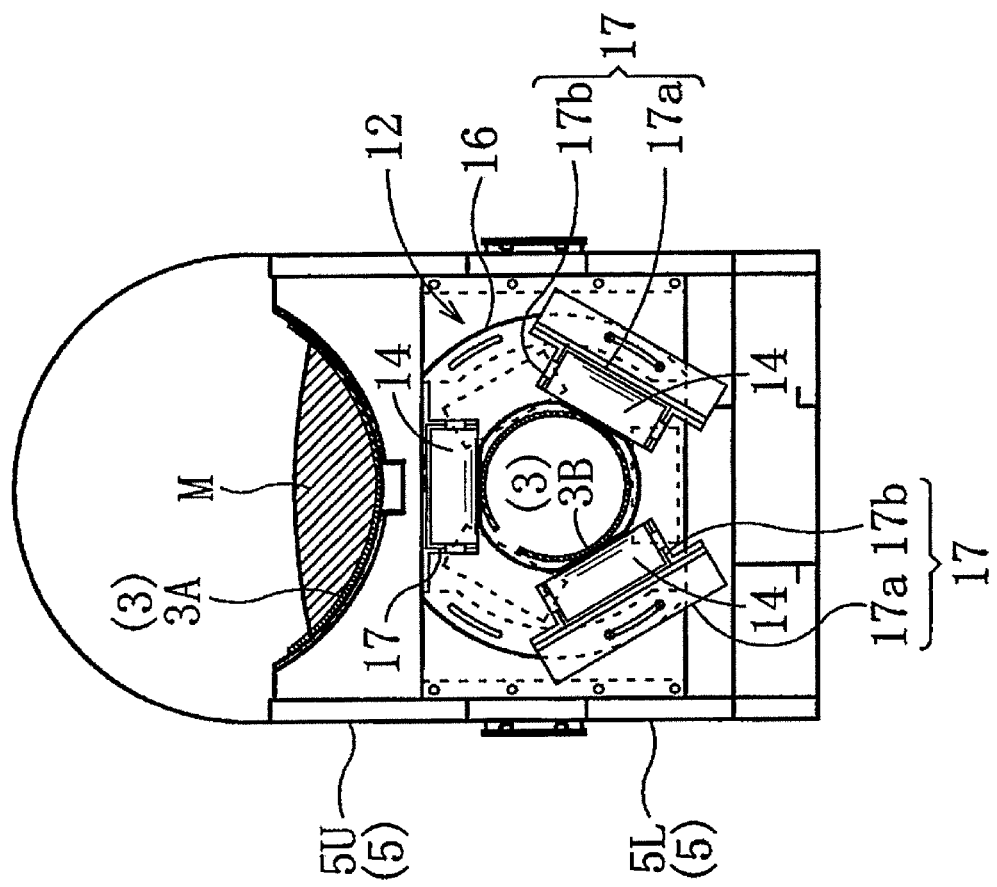
FIG. 5 is a cross-sectional view taken along line V-V of FIG. 1.
Figure 6:
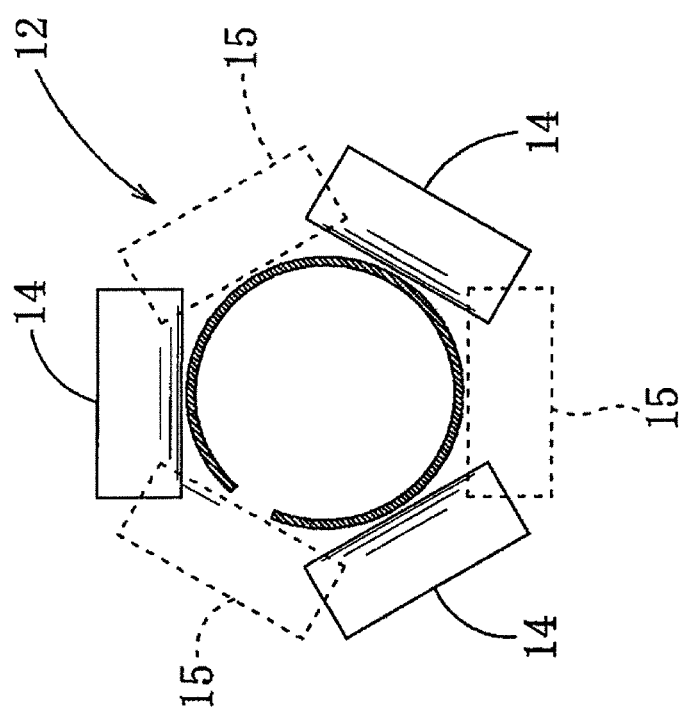
FIG. 6 is a view showing arrangement of rollers in a roller guide mechanism.
Figure 7:
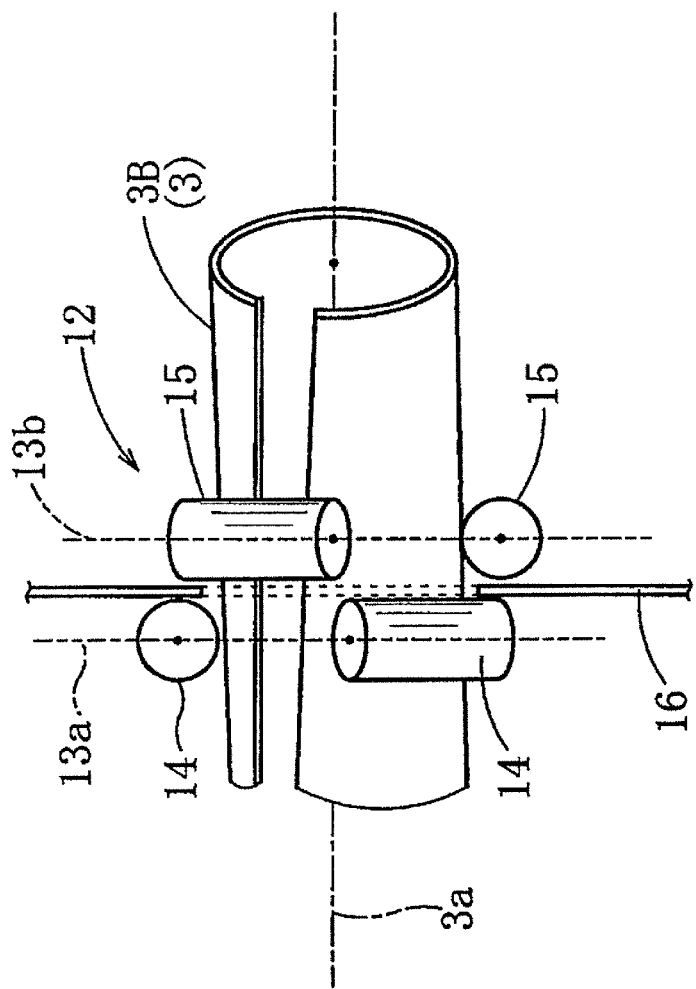
FIG. 7 is a view showing the relationship between the rollers and reference planes in the roller guide mechanism.

As shown in FIGS. 5 to 7, the guide roller mechanism 12 includes three first guide rollers 14 having center axes present in a first reference plane 13a, and three second guide rollers 15 having center axes present in a second reference plane 13b which is spaced a predetermined distance apart from the first reference plane 13a and is parallel to the first reference plane 13a. The first and second reference planes 13a and 13b are perpendicular to the catenary curve of the belt 3 in a position of the guide roller mechanism 12.

The three first guide rollers 14 and the three second guide rollers 15 in the guide roller mechanism 12 are rotatably mounted to a common support plate 16 oriented vertically via mounting tools 17. The support plate 16 is fastened to the lower case 5L. Each mounting tool 17 includes a base metal member 17a fastened to the support plate 16 such that the rotational direction position of the base metal member 17a is adjustable, and a pair of pivot metal members 17b which are fastened to the base metal member 17a such that the position in the direction perpendicular to the support plate 16 is adjustable and configured to rotatably support the rollers 14 and 15.

The three first guide rollers 14 are disposed such that their center axes form an inverted equilateral triangle within the first reference plane 13a, and are disposed annularly in contact with the outer surface of the belt 3 twisted to form the tubular open cross-section. The three second guide rollers 15 are disposed such that their center axes form an equilateral triangle within the second reference plane 13b and are disposed annularly in contact with the outer surface of the belt 3 twisted to form the tubular open-section.

The belt 3 between the pinch rollers 10 and 11 and the guide roller mechanism 12 in the first belt reversing mechanism 4A is curved so as to form the catenary curve, is stably supported by a belt tension, and need not be supported by external means. Therefore, no support rollers and the like are provided between the pinch rollers 10 and 11 and the guide roller mechanism 12. It should be noted that a few shape-correcting rollers or the like may be sometimes provided as desired between the pinch rollers 10 and 11 and the guide roller mechanisms 12, to correct the cross-sectional shape, depending on the structure of the belt 3.

As shown in FIGS. 1 and 4, between the first and second belt reversing mechanisms 4A and 4B, the belt 3 moves with the dirty surface facing upward, and plural support rollers 18 for supporting the belt 3 are attached to the lower case 5L at suitable intervals (e.g., 5 m).

Subsequently, the operation and advantages of the above described belt conveyor C will be described.

In the belt conveyor C, the materials M are fed from a hopper which is not shown onto the belt 3 at one end side (right end side in FIG. 1) of the belt 3, are conveyed to the other end side (left end side in FIG. 1) according to the conveying movement of the belt 3, and are fed from the belt 3 to a material receiver means at the other end. The drive pulley 1 causes the return belt 3B to make a U-turn and the first belt reversing mechanism 4A reverses the return belt 3B. After that, the return belt 3B moves to the second belt reversing mechanism 4B with the dirty surface facing upward. The second belt reversing mechanism 4B reverses the return belt 3B, and the return belt 3B moves toward the pulley 2 at one end side, with the dirty surface facing downward.

Each of the first and second belt reversing mechanisms 4A and 4B includes the two sets of pinch rollers 10 and 11 and the two sets of guide roller mechanisms 12 which are configured to guide the belt 3 in a tubular shape from outside between the pinch rollers 10 and 11 such that the belt 3 is reversed 180 degrees and twisted to cause the center portion of the span between the pinch rollers 10 and 11 to form the tubular open cross-section with the dirty surface facing inward, and the belt 3 is disposed so as to substantially form the catenary curve between the two sets of the pinch rollers 10 and 11. Therefore, the cross-sectional shape of the belt 3 is easily stabilized, and it is not necessary to forcibly support the belt 3 and correct the cross-sectional shape of the belt 3 against the tension and weight of the belt 3. This makes it unnecessary to add auxiliary rollers for supporting the belt 3 or correcting the cross-sectional shape of the belt 3 in addition to the two sets of guide roller mechanisms 12, or makes it possible to reduce the auxiliary rollers in number. As a result, facility cost of the belt conveyor C can be reduced.

Since the cross-sectional shape of the belt 3 is easily automatically corrected, a burden of maintenance work for maintaining and inspecting the belt, the guide roller mechanism 12 and the like can be reduced. In addition, since repetitive uneven deformation of the belt 3 does not substantially occur, durability of the belt 3 can be improved.

The guide roller mechanism 12 includes the three first guide rollers 14 having center axes present in the first reference plane 13a and the three second guide rollers 15 having center axes present in the second reference plane 13b which is spaced a predetermined distance apart from the first reference plane 13a and is parallel to the first reference plane 13a, and the first and second reference planes 13a and 13b are perpendicular to the catenary curve of the belt 3 in the position of the guide roller mechanism 12. Since the rotational direction of the three first guide rollers 14 around the first reference plane 13a conforms to the movement direction of the belt 3, the operation stability and durability of the first guide rollers 14 can be ensured. Likewise, since the rotational direction of the three second guide rollers 15 around the second reference plane 13b conforms to the movement direction of the belt 3, the operation stability and durability of the second guide rollers 15 can be ensured. Subsequently, modifications of the embodiment will be described.

(1) Whereas each of the belt reversing mechanisms 4A and 4B includes the two sets of guide roller mechanisms 12, it may include one set or three or more sets of guide roller mechanisms 12.

(2) Whereas each guide roller mechanism 12 includes three first guide rollers 14 and three second guide rollers 15, it may include four first guide rollers 14 and four second guide rollers 15.

Figure 8:
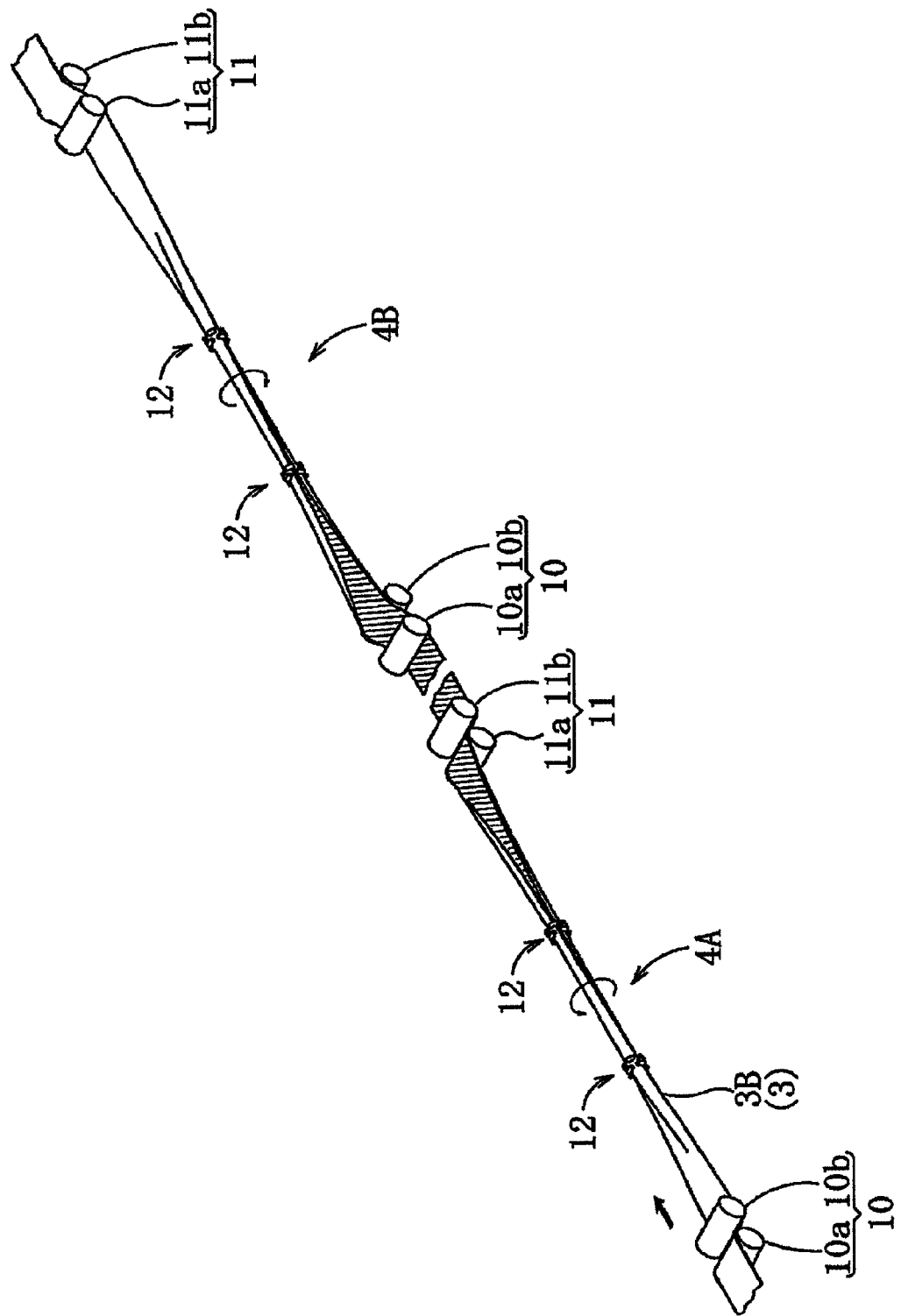
FIG. 8 is a view of a modification example, corresponding to FIG. 2.

(3) As shown in FIG. 8, the twisting directions of the belt 3 in the belt reversing mechanisms 4A and 4B in the above described embodiment may be reversed.

(4) In addition to the above, persons skilled in the art can practice the present invention by modifying the above described embodiment, and the present invention encompasses such modified examples.

Industrial Applicability

The present invention is applicable to uses in which the belt cross-sectional shape of a belt conveyor reversing apparatus is stabilized, a burden of maintenance work can be reduced, and durability of a belt can be improved.

The invention claimed is:

1. A belt conveyor comprising:
    an endless loop belt which is wrapped around pulleys at both ends thereof and is configured to revolve; and
    a first belt reversing mechanism and a second belt reversing mechanism which are provided at an upstream portion and a downstream portion of a return belt, respectively, in a belt movement direction, and are configured to reverse the belt 180 degrees;
    wherein each of the first and second belt reversing mechanisms includes two sets of pinch rollers which are provided so as to be spaced apart from each other in a belt movement direction and configured to support the belt, and one or more sets of guide roller mechanisms which are provided so as to be spaced apart from each other in the belt movement direction and are configured to guide the belt in a tubular shape from outside between the pinch rollers such that the belt is reversed 180 degrees and twisted to cause a center portion of a span between the pinch rollers to form a tubular open cross-section with a dirty surface facing inward; and
    wherein the belt between the two sets of pinch rollers forms a catenary curve or a curve close to the catenary curve, the catenary curve being defined by a weight of the belt per unit length, a tension applied to the belt, and the span between the pinch rollers, and the guide roller mechanisms are provided at the belt forming the catenary curve or the curve close to the catenary curve.

2. The belt conveyor according to claim 1,
    wherein the guide roller mechanism includes plural first guide rollers having center axes present in a first reference plane and plural second guide rollers having center axes present in a second reference plane which is spaced a predetermined distance apart from the first reference plane and is parallel to the first reference plane; and
    wherein the first and second reference planes are provided to extend in a direction perpendicular to the catenary curve of the belt or a curve close to the catenary curve in a position of the guide roller mechanism.

3. The belt conveyor according to claim 1, wherein the catenary curve of the belt between the two sets of pinch rollers is defined by the mathematical formula:

$$Y=(T/W)\times[\cos h(X\times W/T)-1]; \text{where}$$

T is a tension of the belt, and
W is a weight of the belt per unit length.

4. The belt conveyor according to claim 1, wherein a center of the curve close to the catenary curve is defined by the mathematical formula:

$$\delta = WL^2/(8T); \text{ where}$$

T is a tension of the belt;
W is a weight of the belt per unit length; and
L is a Length of the belt.

5. The belt conveyor according to claim 1, wherein the catenary curve is formed between the two sets of pinch rollers along a length of the belt.

6. The belt conveyor according to claim 1, wherein one set of guide roller mechanisms in the one or more sets of guide roller mechanisms is formed by three guide rollers having center axes that are arranged to form an equilateral triangle having a center disposed on the catenary curve formed by a center of the belt.

* * * * *